United States Patent
Kamouchi et al.

(10) Patent No.: US 12,321,020 B2
(45) Date of Patent: Jun. 3, 2025

(54) OPTICAL CONNECTOR CLEANING TOOL

(71) Applicant: NTT ADVANCED TECHNOLOGY CORPORATION, Kanagawa (JP)

(72) Inventors: Terumasa Kamouchi, Kanagawa (JP); Kazutoshi Ando, Kanagawa (JP); Etsu Hashimoto, Kanagawa (JP)

(73) Assignee: NTT ADVANCED TECHNOLOGY CORPORATION, Kanagawa (JP)

( * ) Notice: Subject to any disclaimer, the term of this patent is extended or adjusted under 35 U.S.C. 154(b) by 412 days.

(21) Appl. No.: 17/431,656

(22) PCT Filed: Nov. 26, 2019

(86) PCT No.: PCT/JP2019/046085
§ 371 (c)(1),
(2) Date: Aug. 17, 2021

(87) PCT Pub. No.: WO2020/170539
PCT Pub. Date: Aug. 27, 2020

(65) Prior Publication Data
US 2022/0137307 A1  May 5, 2022

(30) Foreign Application Priority Data
Feb. 20, 2019  (JP) ................................ 2019-028223

(51) Int. Cl.
*G02B 6/38* (2006.01)
*B08B 1/14* (2024.01)
(Continued)

(52) U.S. Cl.
CPC ............ *G02B 6/3866* (2013.01); *B08B 1/143* (2024.01); *B65H 16/005* (2013.01); *B08B 2240/02* (2013.01); *B65H 16/10* (2013.01)

(58) Field of Classification Search
CPC .. B65H 16/10; B65H 16/005; B08B 2240/02; B08B 1/006; G02B 6/3866
(Continued)

(56) References Cited

U.S. PATENT DOCUMENTS 8,087,118 B2   1/2012  Fujiwara
8,418,305 B2   4/2013  Fujiwara
(Continued)

FOREIGN PATENT DOCUMENTS

EP    3561562 A1    10/2019
JP    2005181971 A  *  7/2005 ............. B08B 11/00
(Continued)

OTHER PUBLICATIONS

International Preliminary Report on Patentability received for PCT Patent Application No. PCT/JP2019/046085, mailed on Sep. 2, 2021, 10 pages (5 pages of English Translation and 5 pages of Original Document).
(Continued)

*Primary Examiner* — Katina N. Henson
(74) *Attorney, Agent, or Firm* — WOMBLE BOND DICKINSON (US) LLP

(57) ABSTRACT

An optical connector cleaning tool includes a cleaning tool main body, a feed-side bobbin, a cleaning head (cleaning portion), a winding-side bobbin, a moving body that moves at the time of cleaning, a feed mechanism that sends an unused cleaning medium in synchronism with the moving body, and a winding mechanism that drives the winding-side bobbin. The feed mechanism moves a turn-back portion at one point where the cleaning medium is turned back in a direction to separate from the winding-side bobbin. The winding mechanism includes a driving piece that engages with a rotation body of the winding-side bobbin. The driving piece slips with respect to the rotation body when a load to
(Continued)

press engaging projections of the rotation body has reached a predetermined load.

8 Claims, 16 Drawing Sheets

(51) Int. Cl.
*B65H 16/00* (2006.01)
*B65H 16/10* (2006.01)

(58) Field of Classification Search
USPC ........................................................ 15/210.1
See application file for complete search history.

(56) References Cited

U.S. PATENT DOCUMENTS

| | | |
|---|---|---|
| 2007/0023067 A1 | 2/2007 | Kida et al. |
| 2009/0185848 A1 | 7/2009 | Ushijima |
| 2010/0043159 A1 | 2/2010 | Fujiwara |
| 2016/0041345 A1* | 2/2016 | Kamouchi ........... G02B 6/3866 15/97.1 |
| 2016/0103317 A1 | 4/2016 | Bie et al. |
| 2019/0384012 A1* | 12/2019 | Nakane .................. B08B 1/008 |

FOREIGN PATENT DOCUMENTS

| | | |
|---|---|---|
| JP | 4579330 B2 | 11/2010 |
| JP | 5439557 B2 | 3/2014 |
| JP | 2018-128598 A | 8/2018 |
| WO | 2014/141405 A1 | 9/2014 |

OTHER PUBLICATIONS

International Search Report and Written Opinion received for PCT Patent Application No. PCT/JP2019/046085, mailed on Jan. 21, 2020, 12 pages (5 pages of English Translation and 7 pages of Original Document).

Supplementary European Search Report and Search Opinion received for EP Patent Application No. 19915809.8, mailed on Oct. 18, 2022, 9 pages.

* cited by examiner

FRONT ← → REAR

OPTICAL CONNECTOR CLEANING TOOL

TECHNICAL FIELD

The present invention relates to an optical connector cleaning tool including a winding mechanism configured to wind only a cleaning medium drawn out by a cleaning operation.

BACKGROUND ART

As a conventional optical connector cleaning tool configured to clean a connecting end face of an optical connector, there exists an optical connector cleaning tool described in, for example, patent literature 1. In the optical connector cleaning tool disclosed in patent literature 1, a cleaning medium pressed against a connecting end face of an optical connector moves with respect to the connecting end face, thereby performing cleaning. An optical connector cleaning tool of this type includes a cleaning tool main body to be gripped by an operator, and a moving body including a projecting portion projecting from the cleaning tool main body. The moving body can translate in a direction in which the projecting portion projects.

In the cleaning tool main body, a feed-side bobbin that holds an unused cleaning medium wound in a roll, a winding-side bobbin that winds a used cleaning medium, a winding mechanism that rotates the winding-side bobbin in a winding direction, and the like are provided. The cleaning medium is passed through a medium path that starts from the feed-side bobbin, passes through the distal end of the projecting portion, and reaches the winding-side bobbin. The cleaning medium that is exposed at the distal end of the projecting portion cleans the optical connector.

The winding mechanism employs a so-called "fixed angle feed" structure in which a linear motion of the moving body that moves with respect to the cleaning tool main body to make the projecting portion enter the cleaning tool main body is converted into a rotary motion, and the winding-side bobbin is rotated in the winding direction to perform winding. To wind the cleaning medium using the winding mechanism, first, the operator pushes the cleaning tool main body to the optical connector side in a state in which the distal end of the projecting portion is pressed to the optical connector side. With this operation, the moving body moves with respect to the cleaning tool main body to make the projecting portion enter the cleaning tool main body. When the moving body moves in this way, the cleaning medium is wound by a length corresponding to the rotation angle of the winding-side bobbin, and the unused cleaning medium is fed to the distal end of the projecting portion.

RELATED ART LITERATURE

Patent Literature

Patent Literature 1: Japanese Patent No. 4579330
Patent Literature 2: Japanese Patent No. 5439557

DISCLOSURE OF INVENTION

Problem to be Solved by the Invention

In the above-described "fixed angle feed" winding mechanism, as the number of times of cleaning increases, the winding amount of the cleaning medium around the winding-side bobbin increases, and the winding diameter of the winding-side bobbin becomes large. Hence, the use amount (winding amount) of the cleaning medium is different between the start of use and the end of use of the cleaning tool. More specifically, in a case in which the winding-side bobbin rotates by $\theta°$ in one cleaning operation, letting r be the winding diameter, the length of the wound cleaning medium is $r\theta$. As the number of times of cleaning increases, the winding diameter r becomes large. Hence, the length of the wound cleaning medium also becomes large.

However, the length of the cleaning medium needed for cleaning does not depend on the cleaning count, and becomes an almost constant length if the purpose is to remove similar dirt. In the conventional optical connector cleaning tool of the fixed angle feed structure, the length of the cleaning medium that has increased as the number of times of cleaning increases is excessive, and this is a factor that limits the number of times of cleaning more than necessary. From this viewpoint, it can be said that "fixed length feed" that feeds only the cleaning medium of a predetermined length and winds it is more ideal as the feed mechanism of the cleaning medium than "fixed angle feed".

A conventional feed mechanism of "fixed length feed" is described in, for example, patent literature 2. The feed mechanism disclosed in patent literature 2 includes a moving-side hooking portion provided on a moving body that moves with respect to a cleaning tool main body, and a fixed-side hooking portion provided on the cleaning tool main body so as to be adjacent to the moving-side hooking portion. A cleaning medium extending from the distal end side of a projecting portion to the cleaning tool main body side is looped over the moving-side hooking portion, and then looped over the fixed-side hooking portion and wound around a winding-side bobbin. According to the feed mechanism, since the cleaning tool main body moves with respect to the moving body at the time of cleaning, the interval between the moving-side hooking portion and the fixed-side hooking portion increase. The cleaning medium of a length corresponding to the distance of separation between the hooking portions is drawn out of a feed-side bobbin. That is, a fixed length feed mechanism is implemented using the structure in which the separation distance between the hooking portions is constant.

In addition, the feed mechanism includes a slip mechanism to prevent the winding-side bobbin from further rotating in the winding direction in a state in which the cleaning medium is wound around the winding-side bobbin by the length corresponding to the distance of separation between the hooking portions. The slip mechanism is formed by a friction plate provided on a gear configured to drive the winding-side bobbin, and a friction surface provided on the winding-side bobbin. The friction plate is pressed against the friction surface by the elasticity of its own, and slips with respect to the friction surface when a force (a force for further rotating the winding-side bobbin) more than a friction resistance is applied.

The feed mechanism of fixed length feed disclosed in patent literature 2 implements feed of a fixed length. However, because the dedicated slip mechanism is needed, the structure is complex, and the number of components is large. Additionally, in the feed mechanism, since the cleaning medium is turned back twice at the moving-side hooking portion and the fixed-side hooking portion, the resistance when drawing out the cleaning medium is large.

It is an object of the present invention to provide an optical connector cleaning tool that can wind a cleaning medium of a predetermined length with a simple structure using a small number of components and also reduces the resistance when drawing out the cleaning medium of the predetermined length.

Means of Solution to the Problem

In order to achieve the above-described object, according to the present invention, there is provided an optical connector cleaning tool comprising a cleaning tool main body including a grip portion, a feed-side bobbin configured to hold an unused cleaning medium wound in a roll and rotatably provided in the cleaning tool main body, a cleaning portion on which the cleaning medium drawn out of the feed-side bobbin is exposed, a winding-side bobbin configured to wind the used cleaning medium that has passed through the cleaning portion and provided in the cleaning tool main body to be rotatable in a winding direction to wind the cleaning medium, a moving body configured to reciprocally move with respect to the cleaning tool main body in synchronism with a cleaning operation, a feed mechanism configured to be interlocked with the moving body, draw the used cleaning medium, and feed the unused cleaning medium to the cleaning portion, and a winding mechanism configured to be interlocked with the moving body and drive the winding-side bobbin in the winding direction, wherein the feed mechanism includes a turn-back portion at one point where the cleaning medium is turned back between the cleaning portion and the winding-side bobbin, and is configured to move the turn-back portion in a direction to separate from the winding-side bobbin, the winding mechanism comprises a rotation body including an outer peripheral surface provided with a number of engaging projections and configured to rotate integrally with the winding-side bobbin, and a driving piece extending in a tangent direction of the rotation body and formed to engage with the engaging projections, and elastically supported by the moving body, the driving piece is configured to press the engaging projections along with movement of the moving body, and when a load to press the engaging projections has reached a predetermined load, slip with respect to the rotation body, and the predetermined load may be a load higher than a load generated when the winding-side bobbin winds the cleaning medium drawn out by the feed mechanism, and a load lower than a load generated when the winding-side bobbin rotates in the winding direction to draw the cleaning medium out of the feed-side bobbin.

Effect of the Invention

In the optical connector cleaning tool according to the present invention, to prevent the winding-side bobbin from excessively winding the cleaning medium, a friction member as described patent literature 2 is not needed, and the prevention can be done only by the components necessary for driving the winding-side bobbin.

In addition, since the turn-back portion for the cleaning medium is located only at one point, the cleaning medium can be drawn out with a small force.

Hence, according to the present invention, it is possible to provide an optical connector cleaning tool that can wind the cleaning medium of a predetermined length with a simple structure using a small number of components and also reduces the resistance when drawing out the cleaning medium of the predetermined length.

BEST MODE FOR CARRYING OUT THE INVENTION

An optical connector cleaning tool according to an embodiment of the present invention will now be described with reference to FIGS. 1 to 17.

DESCRIPTION OF BASIC ARRANGEMENT OF PRESENT INVENTION

To implement fixed length feed that feeds only a cleaning medium of a predetermined length, a feed mechanism that draws out the cleaning medium of a predetermined length, and a winding mechanism that winds only the drawn cleaning medium are necessary. In the present invention, as for the former mechanism that draws out the cleaning medium of a predetermined length, a mechanism in which one turn back suffices is formed, as described above, and cleaning can be performed by a light force. The length of the cleaning medium to draw out is set to be equal to or more than a length necessary for predetermined cleaning of an optical connector.

As for the latter winding mechanism that winds only the drawn cleaning medium, the mechanism itself, which rotates a winding-side bobbin, is formed as a structure that "slips", thereby implementing the fixed length feed mechanism with a simple structure without adding a new component.

The feed mechanism that draws out the cleaning medium of a predetermined length, and the mechanism that winds only the drawn cleaning medium will be described in detail with reference to the accompanying drawings.

Figure 1:
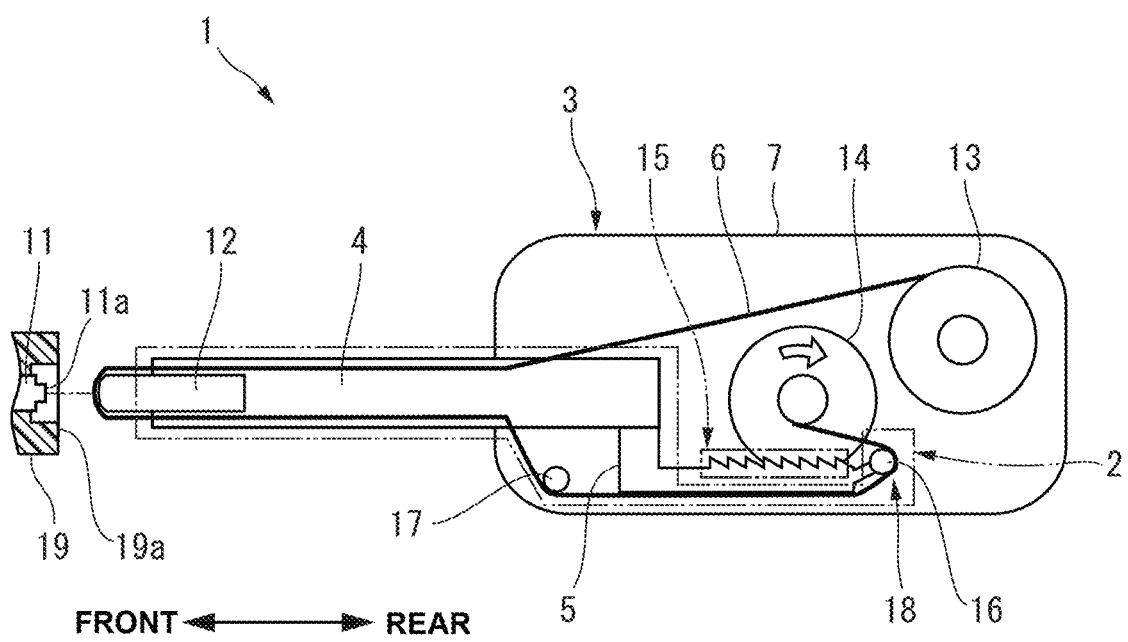
FIG. 1 is a schematic view showing the arrangement of the feed mechanism of an optical connector cleaning tool according to the present invention.

FIG. 1 is a schematic view showing the arrangement of a feed mechanism 2 of an optical connector cleaning tool 1 according to the present invention. The feed mechanism 2 is formed using a projecting portion 4 projecting from a cleaning tool main body 3, and a moving body 5 connected to the rear end of the projecting portion 4. The feed mechanism 2 feeds only a predetermined length of a linear cleaning medium 6 such as a thread or a string.

The cleaning tool main body 3 includes a box-shaped grip portion 7 to be gripped by an operator (not shown), attachment seats and support structures used to attach components to be described later, and the like, although not illustrated. If a direction needs to be shown when explaining the portions of the optical connector cleaning tool 1 below, a direction (the left direction in FIG. 1) in which the projecting portion 4 projects from the cleaning tool main body 3 will be defined as a front side, and a direction opposite to this direction will be defined as a rear side.

The moving body 5 is supported by the cleaning tool main body 3 so as to be reciprocally movable in a direction (front-and-rear direction) parallel to the direction in which the projecting portion 4 projects from the cleaning tool main body 3. In addition, the moving body 5 is biased by a spring member (not shown) in a direction (to the front side) in which the projecting portion 4 projects from the cleaning tool main body 3.

The distal end portion of the projecting portion 4 is formed into a tubular shape. A cleaning head 12 to be pressed against an optical connector 11 is provided at the distal end portion of the projecting portion 4. In this embodiment, the cleaning head 12 corresponds to "cleaning portion" in the present invention. The cleaning head 12 is configured such that the cleaning medium 6 passes through the distal end face, and such that in a state in which the cleaning head 12 is pressed against the optical connector 11, the cleaning medium 6 contacts a connecting end face 11a that is the target cleaning surface of the optical connector 11. The cleaning head 12 is incorporated in the projecting portion 4 so as to be movable in the front-and-rear direction, and is biased to the front side by a head spring (not shown).

The cleaning tool main body 3 incorporates a feed-side bobbin 13 that supplies the cleaning medium 6, and a winding-side bobbin 14 that winds the cleaning medium 6. The feed-side bobbin 13 and the winding-side bobbin 14 are rotatably supported by the cleaning tool main body 3 in a state in which their axes are orthogonal to the moving direction of the moving body 5. The feed-side bobbin 13 holds the cleaning medium 6 wound in a roll. In this embodiment, the winding-side bobbin 14 is located between the feed-side bobbin 13 and the projecting portion 4. In the present invention, however, the relative positions of the feed-side bobbin 13 and the winding-side bobbin 14 are not substantial, and they may be arranged at positions opposite to each other in the front-and-rear direction or may be arranged side by side. In addition, the winding-side bobbin 14 is configured to be rotated only in the winding direction by a one-way latch (not shown). The winding direction is the clockwise direction as indicated by an arrow in FIG. 1. The cleaning medium 6 is wound around the winding-side bobbin 14 from one side (the lower side in FIG. 1) of the direction orthogonal to the moving direction of the moving body 5 and the axial direction of the winding-side bobbin 14.

Although the rotation direction of the feed-side bobbin 13 need not be mechanically limited, the feed-side bobbin 13 is configured not to excessively rotate in the feed direction by inertia to unnecessarily feed the cleaning medium 6.

A gear 15 that forms a part of a winding mechanism configured to rotate the winding-side bobbin 14 in the winding direction is also provided in the moving body 5. The winding mechanism will be described later. In addition, the moving body 5 includes a movable rod 16 that is in contact with the cleaning medium 6 on the opposite side of the projecting portion 4 with respect to the center of the winding-side bobbin 14, and is connected to the above-described projecting portion 4. In this embodiment, the movable rod 16 corresponds to "turning element" in the invention described in claim 2.

The cleaning medium 6 starts from the feed-side bobbin 13, passes through the projecting portion 4, passes through the distal end face of the cleaning head 12, passes through the projecting portion 4 again, and returns into the cleaning tool main body 3. The cleaning medium 6 is then hooked on a fixed rod 17 fixed in the cleaning tool main body 3, turned back by the movable rod 16 of the moving body 5, and wound around the winding-side bobbin 14. In the moving path of the cleaning medium 6 between the cleaning head 12 and the winding-side bobbin 14, a turn-back portion 18 to turn back the cleaning medium 6 is located only at one point where the cleaning medium 6 is turned back by the movable rod 16. The feed mechanism 2 is configured such that the turn-back portion 18 moves in a direction to separate from the winding-side bobbin 14. Note that the movable rod 16 and the fixed rod 17 need not always have a rod shape as long as they have a function of deciding the moving path of the cleaning medium 6. For example, these can also be formed using an edge side of a plate. Furthermore, an example has been described here in which the fixed rod 17 is fixed in the cleaning tool main body 3 so the shape of the path of the movable rod 16 does not change from the distal end face of the cleaning head 12 before and after the movement of the moving body 5. However, it is substantially only necessary that the path length of the path of the movable rod 16 does not change from the distal end face of the cleaning head 12 before and after the movement of the moving body 5. The fixed rod 17 need not always be fixed on the side of the cleaning tool main body 3, and may be fixed on the side of the moving body 5.

To clean the connecting end face 11a of the optical connector 11 using the optical connector cleaning tool 1, the cleaning is executed in a state in which, for example, the optical connector 11 is held by a holding member such as an adapter 19, as shown in FIG. 1. The cleaning is performed by pressing the distal end face of the cleaning head 12 against the connecting end face 11a of the optical connector 11 and pressing the distal end of the projecting portion 4 against a pressure receiving portion 19a of the adapter 19. When the projecting portion 4 is pressed against the adapter 19, the projecting portion 4 moves relatively in a direction in which it is pushed into the cleaning tool main body 3. In synchronism with this, the gear 15 and the movable rod 16 on the moving body 5 also move in the same direction. At this time, since the cleaning medium 6 is drawn out by the movable rod 16, the unused cleaning medium 6 moves while being in contact with the connecting end face 11a of the optical connector 11, and dust on the connecting end face 11a of the optical connector 11 is wiped by the cleaning medium 6.

<Description of Length of Cleaning Medium 6 Drawn Out by Feed Mechanism>

Figure 2A:
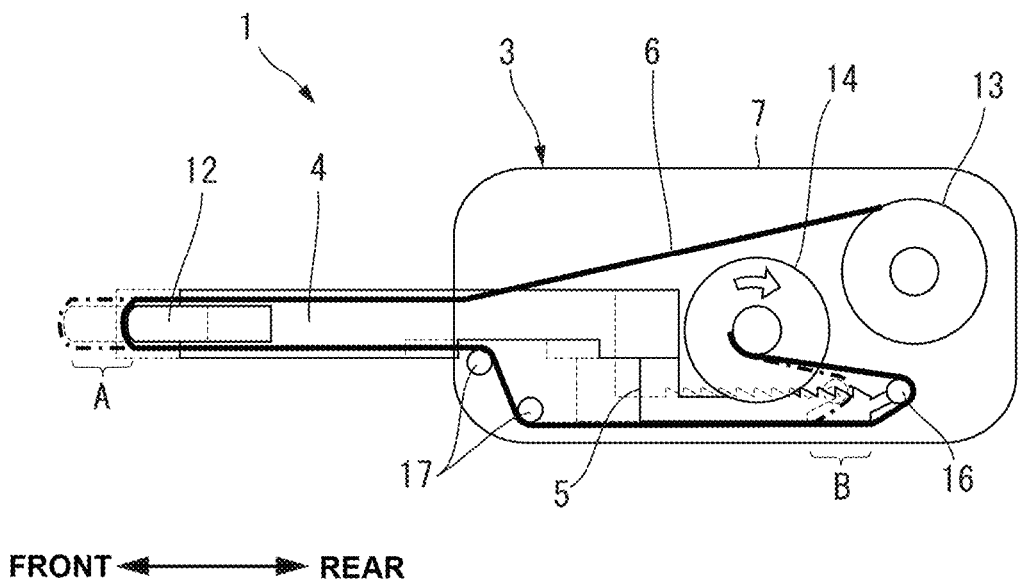
FIG. 2A is a schematic view showing the arrangement of the feed mechanism of the optical connector cleaning tool according to the present invention.
Figure 2B:
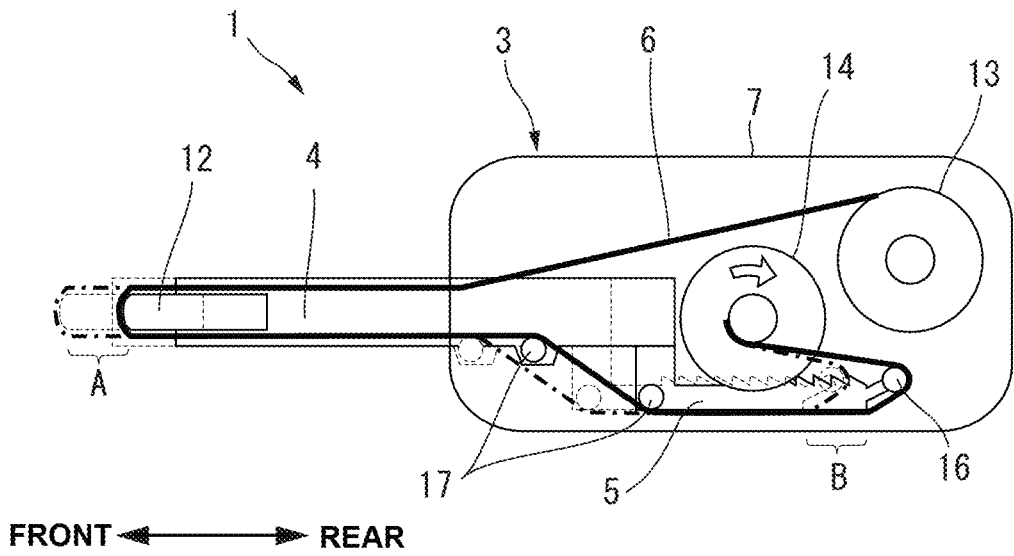
FIG. 2B is a schematic view showing the arrangement of the feed mechanism of the optical connector cleaning tool according to the present invention.

The length of the cleaning medium 6 to draw out will be described with reference to FIGS. 2A and 2B. FIG. 2A shows, in a superposed manner, a normal state in which the cleaning operation is not being performed and a state in which the cleaning operation is performed, and the projecting portion 4 is pushed into the cleaning tool main body 3 in a case in which the fixed rod 17 is fixed on the side of the main body 3. A two-dot chain line represents the cleaning medium 6 in the normal state, and a solid line represents the cleaning medium 6 in the pushed state. As is apparent from FIG. 2A, the difference between the normal state and the pushed state appears near the distal end portion and the movable rod 16, and the rest is the same. FIG. 2B shows, in a superposed manner, a normal state in which the cleaning operation is not being performed and a state in which the cleaning operation is performed, and the projecting portion 4 is pushed into the cleaning tool main body 3 in a case in which the fixed rod 17 is fixed on the side of the moving body 5. In FIG. 2B, the shape of the path changes depending on the state, unlike FIG. 2A. However, the path length itself from the distal end face of the cleaning head 12 to the movable rod 16 does not change, as can be seen. For this reason, in FIG. 2B as well, the difference between the normal state and the pushed state appears near the distal end portion and the movable rod 16, and the rest is the same concerning the path length. The difference at the distal end portion is that the cleaning medium 6 in the normal state is longer by twice a retreat amount A of the cleaning head 12 because of the retreat of the cleaning head 12.

The difference near the movable rod 16 is that the cleaning medium 6 becomes longer by an amount depending on a retreat amount B of the moving body 5 in the pushed state. This amount is almost twice of the retreat amount of the moving body 5 and, more strictly, has a value obtained by adding the distance difference from the winding-side bobbin 14 to the retreat amount of the moving body 5. When the distance between the winding-side bobbin 14 and the movable rod 16 is defined as a separation distance, the distance difference from the winding-side bobbin 14 is the difference in the separation distance between the normal state and the pushed state. The separation distance will be described here in detail with reference to FIGS. 3A and 3B which extract a portion of FIGS. 2A and 2B.

Figure 3A:
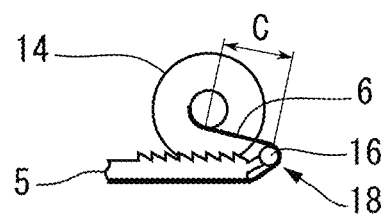
FIG. 3A is a schematic view showing the feed amount of a cleaning medium.
Figure 3B:
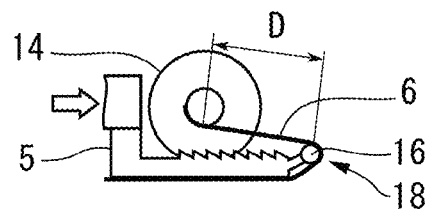
FIG. 3B is a schematic view showing the feed amount of the cleaning medium.

The length of the cleaning medium 6 to draw out is the difference between a separation distance C between the winding-side bobbin 14 and the movable rod 16 in FIG. 3A and a separation distance D between the winding-side bobbin 14 and the movable rod 16 in FIG. 3B. This difference changes a little when the cleaning medium 6 is wound around the winding-side bobbin 14, and the winding radius increases. The change amount is very small as compared to the conventional method using fixed angle feed, and fixed length feed is performed practically.

A condition necessary for updating the cleaning medium 6 exposed to the distal end face of the cleaning head 12 (feeding the cleaning medium 6 to expose an unused portion) is $$\text{(retreat amount } A \text{ of cleaning head 12)} < \text{(retreat amount } B \text{ of moving body 5)} + \text{(difference } D-C \text{ between separation distances)} \quad (1)$$

The difference between the separation distances greatly depends on the position of the movable rod 16, as will be described later. In the optical connector cleaning tool 1 according to the present invention, the position of the movable rod 16 is determined such that equation (1) described above holds.

<Description of Winding Mechanism>

A winding mechanism 21 that winds only the drawn cleaning medium 6 will be described next in detail with reference to FIGS. 4A to 4D.

FIGS. 4A to 4D are schematic views showing the arrangement of the winding mechanism 21 according to the present invention, which winds only the drawn cleaning medium 6. In FIGS. 4A to 4D, the periphery of the distal end portion, which is unnecessary for the description, is removed from FIG. 1, and constituent components necessary for the winding mechanism 21 are added, and the structures are illustrated in more detail.

Figure 4A:
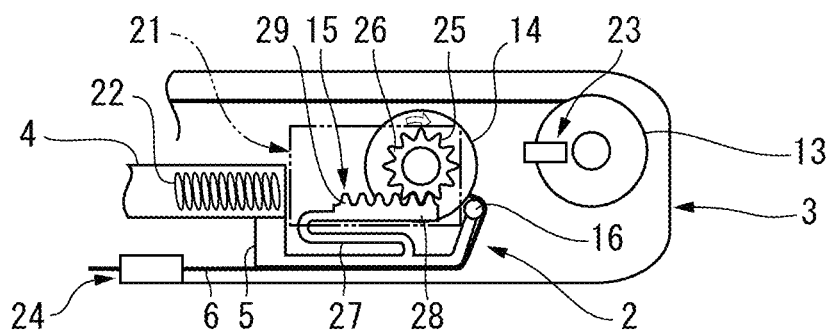
FIG. 4A is a schematic view showing the arrangement of the winding mechanism of the optical connector cleaning tool according to the present invention.

FIG. 4A shows the normal state. In this example, an arrangement is employed in which an elastic body 22 such as a compression coil spring is incorporated in the projecting portion 4, and the projecting portion 4 is pushed into the cleaning tool main body 3 and, after that, returned to the initial position. The elastic body 22 can be incorporated not only in the projecting portion 4 but also in another portion interlocked with the projecting portion 4, for example, the moving body 5 or the like.

In the feed-side bobbin 13, to generate a tension to the cleaning medium 6, a feed-side load structure 23 to be described later applies an appropriate load to the rotation of the feed-side bobbin 13. That is, the feed-side bobbin 13 feeds the cleaning medium 6 only when a load to certain degree is applied. A detailed structure of the feed-side load structure 23 will be described later.

To generate a tension to the cleaning medium 6, a winding-side load structure 24 may be provided at a point where the cleaning medium 6 that has passed through the cleaning head 12 after cleaning passes before reaching the moving body 5. A detailed structure of the winding-side load structure 24 will also be described later.

A rotation body 25 is provided in the winding-side bobbin 14 to rotate integrally with it. The rotation body 25 has an outer peripheral surface provided with a number of engaging projections 26. The rotation body 25 according to this embodiment is formed by a gear.

The moving body 5 includes a driving piece 28 connected via a support spring 27. The driving piece 28 is formed into a plate shape extending in a predetermined length in the tangent direction of the rotation body 25, and elastically supported by the moving body 5 via the support spring 27. The driving piece 28 is provided with a number of engaging projections 29 that engage with the engaging projections 26 of the rotation body 25. The driving piece 28 shown in this embodiment is formed by a rack with the gear 15 formed by a number of engaging projections 29.

The support spring 27 may be a spring like a leaf spring molded integrally with the moving body 5, as shown in FIG. 4A, or may be combined with a spring member formed separately from the moving body 5.

Figure 4B:
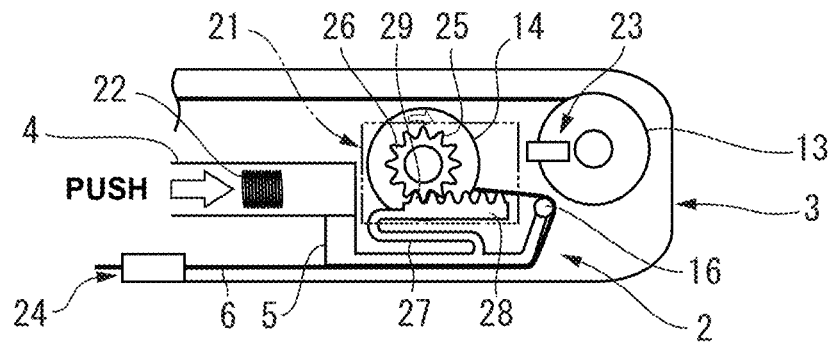
FIG. 4B is a schematic view showing the arrangement of the winding mechanism of the optical connector cleaning tool according to the present invention.

FIG. 4B shows the pushed state. When the projecting portion 4 is pushed, the elastic body 22 is compressed. Since the winding-side bobbin 14 cannot rotate in the direction to draw out the cleaning medium 6, the engaging projections 29 of the driving piece 28 slip with respect to the engaging projections 26 of the rotation body 25 at this time, and the support spring 27 elastically deforms to disengage the driving piece 28 from the rotation body 25 (tooth jump occurs). Hence, the winding-side bobbin 14 never rotates in the direction opposite to the winding direction, and a state in which the moving body 5 is pushed is implemented. In this process, the used cleaning medium 6 is drawn out by the movable rod 16, and the unused cleaning medium 6 is fed to the distal end face of the cleaning head 12.

Figure 4C:
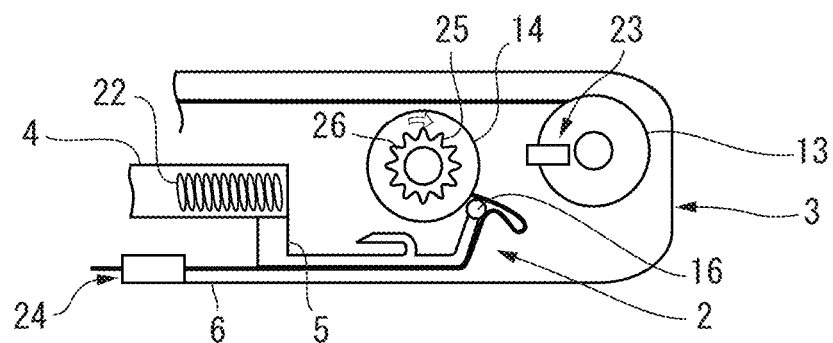
FIG. 4C is a schematic view showing the arrangement of the winding mechanism of the optical connector cleaning tool according to the present invention.

FIG. 4C shows a temporary state in which the driving piece 28 is removed, and shows the state of the cleaning medium 6 when the moving body 5 has been returned from the position shown in FIG. 4B to the position in the normal state by the restoring force of the elastic body 22. In this case, the cleaning medium 6 slacks between the movable rod 16 and the winding-side bobbin 14. The slack occurs in the cleaning medium 6 drawn out of the feed-side bobbin 13 by pushing the moving body 5. The cleaning medium 6 needs to be wound.

Figure 4D:
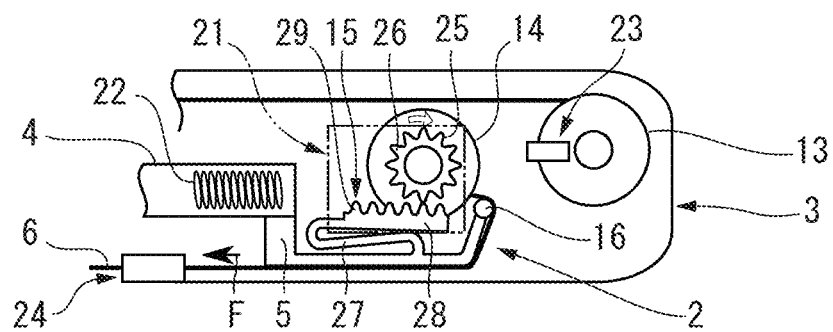
FIG. 4D is a schematic view showing the arrangement of the winding mechanism of the optical connector cleaning tool according to the present invention.

FIG. 4D shows a state on the way of the moving body 5 returned to the position in the normal state by the restoring force of the elastic body 22. In the early stage of the returning process of the moving body 5, the moving body 5 moves in a state in which the engaging projections 29 of the driving piece 28 engage with the engaging projections 26 of the rotation body 25, the rotation body 25 and the winding-side bobbin 14 rotate in the winding direction, and the drawn cleaning medium 6 is wound around the winding-side bobbin 14. Since almost no tension is applied to the cleaning medium 6 in the returning process of the moving body 5, the cleaning medium 6 can be wound by a small force.

When the winding-side bobbin 14 is further biased in the winding direction by the driving piece 28 in a state in which the cleaning medium 6 is wound around the winding-side bobbin 14, the cleaning medium 6 is drawn out by the winding-side bobbin 14. At this time, since the feed-side load structure 23 and the winding-side load structure 24 added as needed exist in addition to the load originally existing in the path of the cleaning medium 6, a large tension F is generated to the cleaning medium 6 as compared to the time of winding the cleaning medium 6 drawn out by the movable rod 16, and as a result, the force for rotating the winding-side bobbin 14 also increases.

The winding mechanism 21 is configured such that the force necessary for rotating the winding-side bobbin 14 in the winding direction in a state in which the tension F acts on the cleaning medium 6 becomes sufficient to cause tooth jump in the driving piece 28. In other words, the driving piece 28 is configured such that the engaging projections 26 of the rotation body 25 are pushed along with the movement of the moving body 5 to the front side and slips with respect to the rotation body 25 when the load pushing the engaging projections 26 has reached a predetermined load. The predetermined load here is a load higher than a load generated when the winding-side bobbin 14 winds the cleaning medium 6 drawn out by the movable rod 16, and a load lower than a load generated when the winding-side bobbin 14 rotates in the winding direction to draw out the cleaning medium 6 from the feed-side bobbin 13.

For this reason, if the cleaning medium 6 drawn out by the movable rod 16 is wound around the winding-side bobbin 14, and after that, the winding-side bobbin 14 is further biased in the winding direction, tooth jump occurs in the driving piece 28. That is, when the engaging projections 29 of the driving piece 28 slip with respect to the engaging projections 26 of the rotation body 25, the support spring 27 elastically deforms, and the driving piece 28 is displaced in a direction to separate from the rotation body 25. The driving piece 28 "slips" (actually, tooth-jumps) with respect to the rotation body 25. Hence, according to this embodiment, it is possible to implement the winding mechanism 21 that winds only the drawn cleaning medium 6.

<Description of Position of Movable Rod 16>

The position of the movable rod 16 with respect to the winding-side bobbin 14 will be described here with reference to FIGS. 5, 6, 7A, 7B, 8A, 8B, 9A, and 9B.

Figure 5:
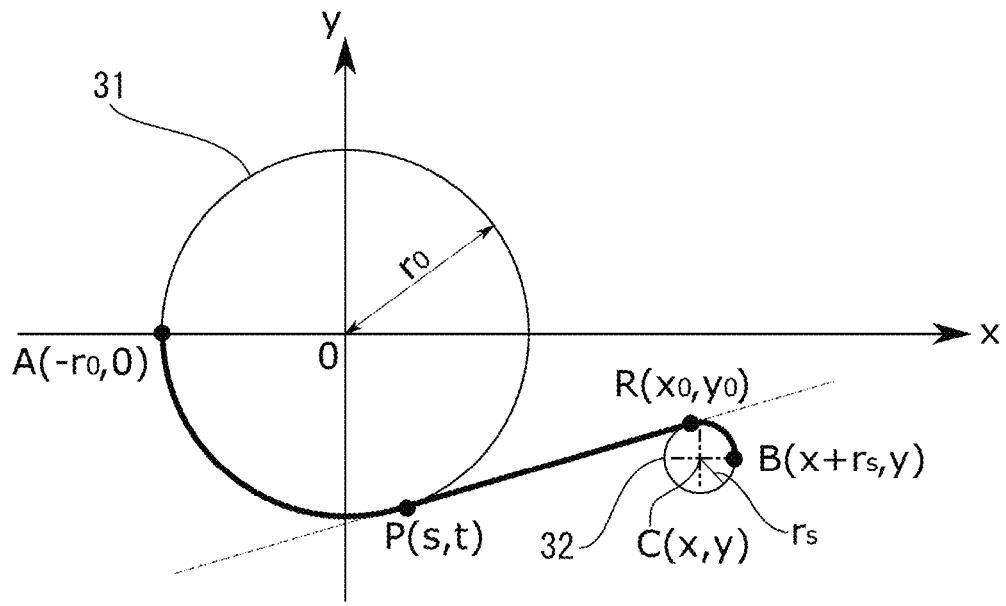
FIG. 5 is a schematic view for explaining the position of a movable rod.

FIG. 5 is a schematic view showing a model used to analyze the effect of the feed mechanism 2. Of two circles 31 and 32 shown in FIG. 5, the larger circle 31 (to be simply referred to as a large circle 31 hereinafter) represents the cleaning medium 6 wound around the winding-side bobbin 14, and the small circle 32 (to be simply referred to as a small circle 32 hereinafter) represents the movable rod 16. To facilitate analysis, the position of the movable rod 16 will be described here using coordinates with respect to an origin set at the center of the large circle 31. The direction to push the projecting portion 4 into the cleaning tool main body 3 is defined as a +X direction.

In FIG. 5, a part of the cleaning medium 6 is indicated by a thick line. The moving path of the cleaning medium 6 does not deform except on the periphery of the distal end portion of the projecting portion 4 and the movable rod 16, as described above. In addition, the moving path of the cleaning medium 6 between the distal end portion of the projecting portion 4 and the movable rod 16 translates but does not change the shape. The shape changes on a curve A-P-R-B from the large circle 31 to the small circle 32 shown in FIG. 5. The point A is a point that is the upstream end of the large circle 31 in the pushing direction. The point B is a point that is the downstream end of the small circle 32 in the pushing direction. A point P and a point R are contacts on the circles.

Let C(x, y) be the center coordinates of the small circle 32, r0 be the radius of the large circle 31 that is, the radius of the cleaning medium 6 wound around the winding-side bobbin 14, and rs be the radius of the small circle 32, that is, the radius of the movable rod 16. Then, since the coordinates of P and R can be calculated, the length of the curve A-P-R-B can also be calculated.

Figure 6:
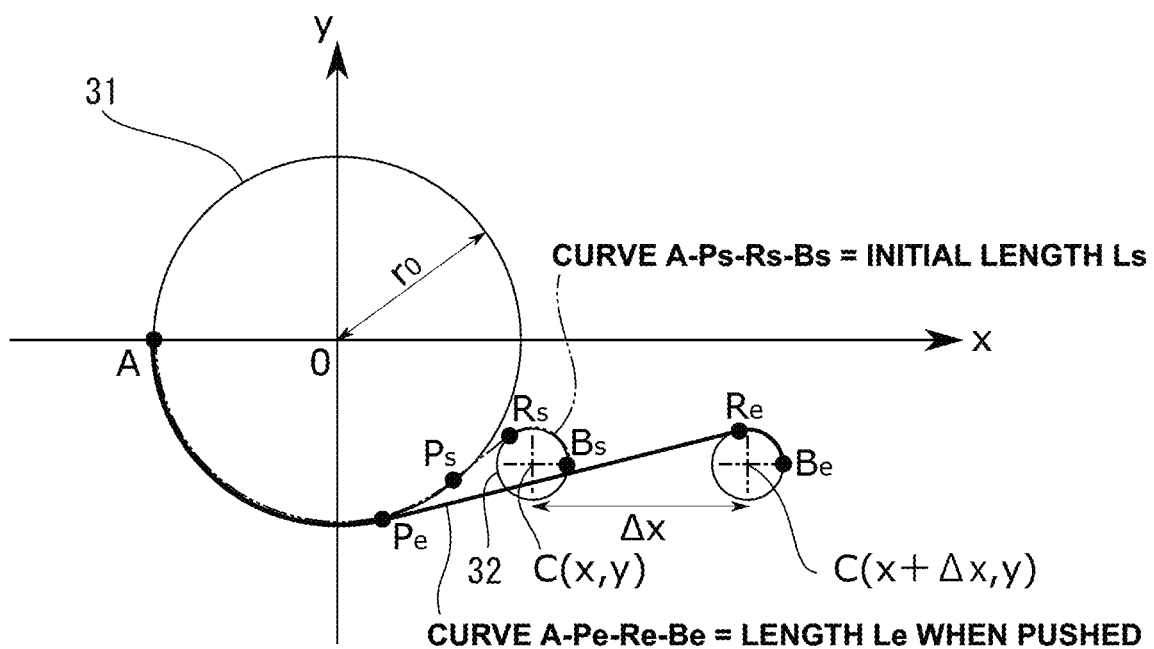
FIG. 6 is a schematic view for explaining the position of the movable rod.

The length of the cleaning medium 6 drawn out by pushing the projecting portion 4 is represented as shown in FIG. 6 using the above-described coordinate system.

A value (Le−Ls) obtained by subtracting a length Ls (two-dot chain line) of a curve A-Ps-Rs-Bs when the center coordinates of the small circle 32 are (x, y) from a length Le (solid line) of a curve A-Pe-Re-Be when center coordinates C of the small circle 32 are (x+Δx, y) is the length of the drawn cleaning medium 6.

Concerning the feed mechanism 2 of the present invention, results of examining the length of the drawn cleaning medium 6 using a simulation model will be described with reference to FIGS. 7A, 7B, 8A, 8B, 9A, and 9B. In this model, the radius r0 of the wound cleaning medium 6 was set to 2.5 to 6 mm (the margin is set because the radius is changed by winding), and the radius rs of the movable rod 16 was set to 1 mm.

<Description of Position of Movable Rod 16 in X Direction>

Figure 7A:
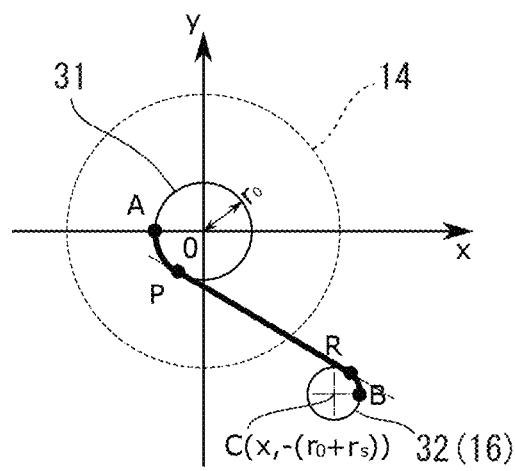
FIG. 7A is a schematic view for explaining the position of the movable rod.
Figure 7B:
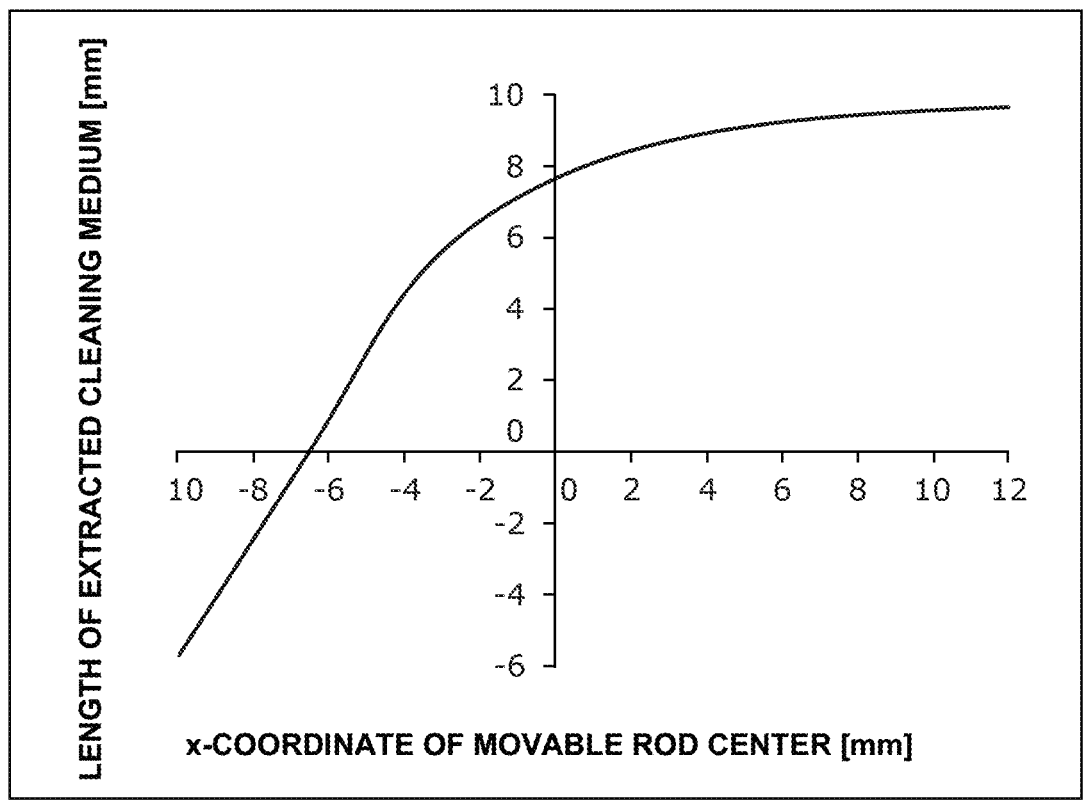
FIG. 7B is a graph showing a change in the length of the drawn cleaning medium.

FIGS. 7A and 7B show a result of obtaining the relationship between the position of the movable rod 16 and the length of the drawn cleaning medium 6 for the x direction using the simulation model. In the simulation model shown in FIG. 7A, the position of the movable rod 16 in the y direction was set to y=8 mm as the closest position within the range where even when the small circle 32 is moved in the x direction, it does not overlap the winding-side bobbin 14 whose radius was 7 mm. In addition, the radius r0 of the wound cleaning medium 6 was 2.5 mm, and the moving amount of the movable rod 16=the pushing length of the projecting portion 4 was 10 mm.

FIG. 7B is a graph of a calculation result in which the x-coordinate position of the movable rod 16 is plotted along the abscissa, and the length of the drawn cleaning medium 6 is plotted along the ordinate. As is apparent from the graph, the length of the drawn cleaning medium 6 depends on the position of the movable rod 16 in the x direction. This length needs to be equal to or more than a length necessary for cleaning. For example, when the cleaning medium 6 that is at least 8 mm long is used for cleaning, the x-coordinate of the movable rod 16 needs to be larger than x=0, as can be seen from the graph. That is, the movable rod 16 needs to come into contact with the cleaning medium 6 on the opposite side of the projecting portion 4 with respect to the center of the winding-side bobbin 14.

<Description of Position of Movable Rod 16 in Y Direction>

Figure 8A:
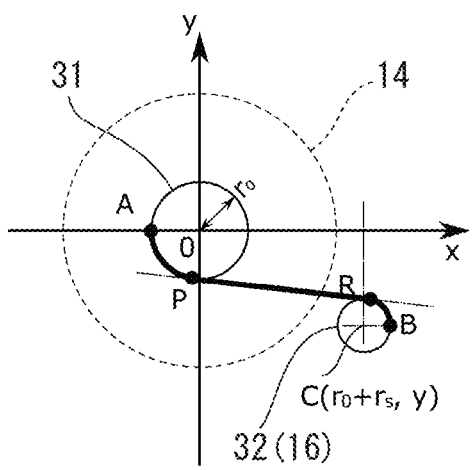
FIG. 8A is a schematic view for explaining the position of the movable rod.
Figure 8B:
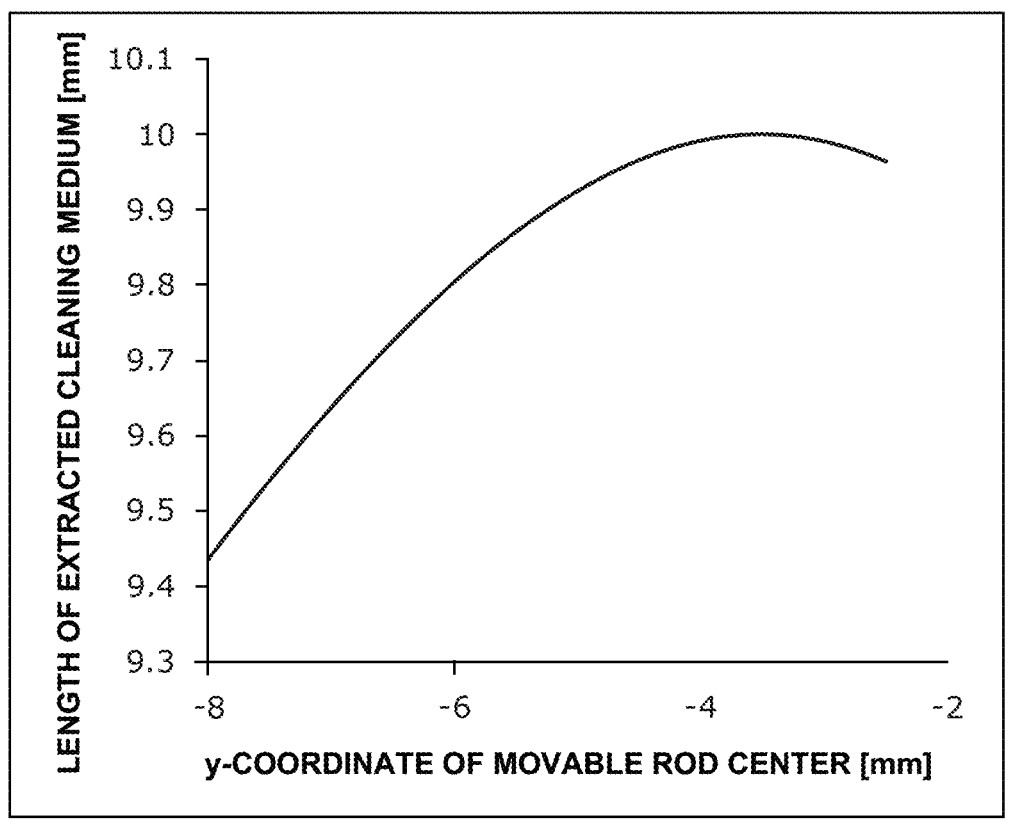
FIG. 8B is a graph showing a change in the length of the drawn cleaning medium.

FIGS. 8A and 8B show a result of obtaining the relationship between the position of the movable rod 16 and the length of the drawn cleaning medium 6 for the y direction using the above-described simulation model. In the simulation model shown in FIG. 8A, the position of the movable rod 16 in the x direction was set to x=8 mm as the closest position within the range where even when the small circle 32 is moved in the y direction, it does not overlap the winding-side bobbin 14 whose radius was 7 mm. The remaining settings are the same as in the simulation model shown in FIG. 7A.

FIG. 8B is a graph of a calculation result in which the y-coordinate position of the movable rod 16 is plotted along the abscissa, and the length of the drawn cleaning medium 6 is plotted along the ordinate. As is apparent from the graph, the length of the drawn cleaning medium 6 depends on the position of the movable rod 16 in the y direction. However, the change amount of the length depending on the position in the y direction is less than 1 mm as compared to the length drawn out (about 10 mm).

The length (10 mm) of pushing the projecting portion 4 and the length of drawing out the cleaning medium 6 match when the movable rod 16 is located at a position y=−3.5 mm.

At this time, the tangent that connects the circles 31 and 32 is horizontal. With this state at the peak, the length of the drawn cleaning medium 6 decreases if y is either increased or decreased. It is estimated from this result that when the y-coordinate of the movable rod 16 is set such that the tangent becomes parallel at the center value of the winding radius r0 of the cleaning medium 6=2.5 to 6 mm, the change of the amount of the cleaning medium 6 drawn out when the winding radius of the cleaning medium 6 changes is minimized. That is, when the y-coordinate of the movable rod 16 is set to {(2.5+6)/2+1}=−5.25 mm in consideration of the size (diameter) of the movable rod 16, fixed length feed that minimizes the change of the amount of the cleaning medium 6 drawn out with respect to the change of the winding radius of the cleaning medium 6 can be implemented.

Hence, on one side (the lower side in FIG. 8A) of the direction orthogonal to the moving direction (the left-and-right direction in FIG. 8A) of the moving body 5 and the axial direction (the direction orthogonal to the sheet surface of FIG. 8A) of the winding-side bobbin 14 with respect to the center of the winding-side bobbin 14, the position of the movable rod 16 at which the tangent between the winding-side bobbin 14 and the movable rod 16 becomes horizontal concerning the direction is defined as a limit position, and the movable rod 16 is preferably arranged between the limit position and the center position of the winding-side bobbin 14.

Figure 9A:
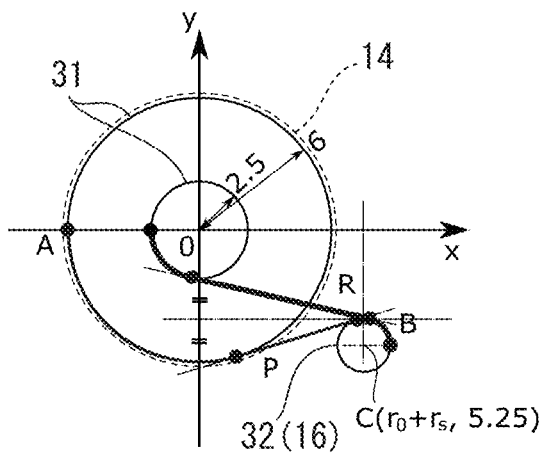
FIG. 9A is a schematic view for explaining a path concerning the radius of the wound cleaning medium.
Figure 9B:
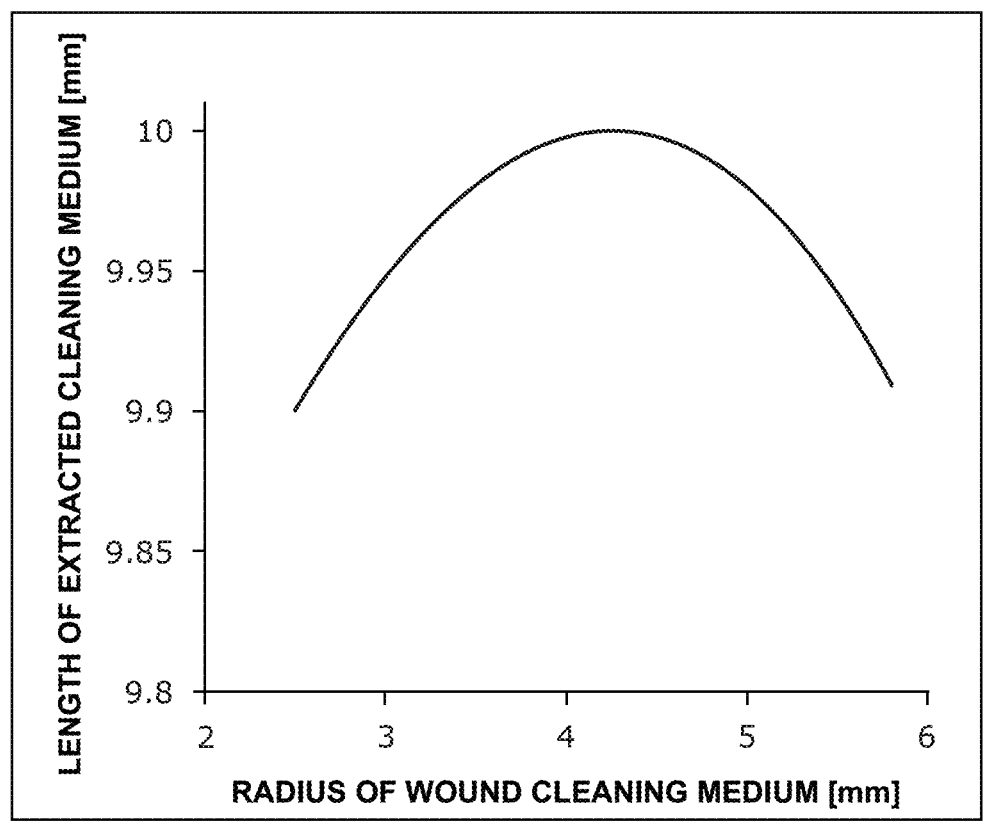
FIG. 9B is a graph showing a change in the length of the drawn cleaning medium.

The relationship between the winding radius of the cleaning medium 6 and the length of the drawn cleaning medium 6 when the winding radius of the cleaning medium 6 changes within the range of 2.5 to 6 mm will be described next with reference to FIGS. 9A and 9B. FIG. 9A is a schematic view showing a simulation model when the y-coordinate of the movable rod 16 is set to y=−5.25 mm, and the winding radius of the cleaning medium 6 is changed within the range of 2.5 to 6 mm. FIG. 9B is a graph showing the relationship between the winding radius of the cleaning medium 6 and the length of the drawn cleaning medium 6. As is apparent from the graph, even if the winding radius of the cleaning medium 6 changes, the change of the length of the drawn cleaning medium 6 is about 0.1 mm. Since the change is 0.1 mm relative to the maximum length of the drawn cleaning medium 6, which is 10 mm, the length drawn out changes only by about 1%, as can be seen. In the conventional fixed angle feed, the cleaning medium 6 is drawn out in proportion to the winding radius. Hence, if the winding radius of the cleaning medium 6 increases by twice or more from 2.5 mm to 6 mm, the length of the drawn cleaning medium 6 also increases by twice or more. As compared to this, it can be said that the feed mechanism 2 according to the present invention can implement fixed length feed sufficient for practical use because the change amount of the length drawn out is remarkably small.

DESCRIPTION OF DETAILED EMBODIMENT

Figure 10A:
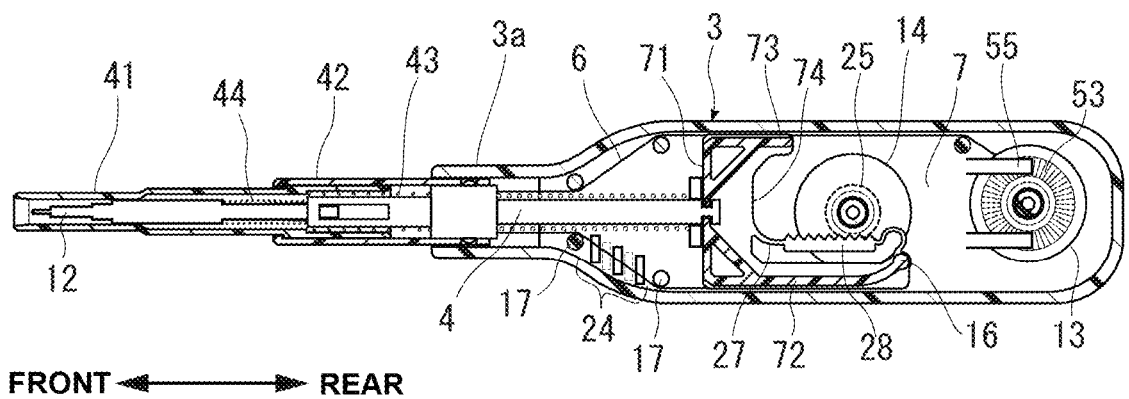
FIG. 10A is a sectional view of the optical connector cleaning tool according to the present invention.
Figure 10B:
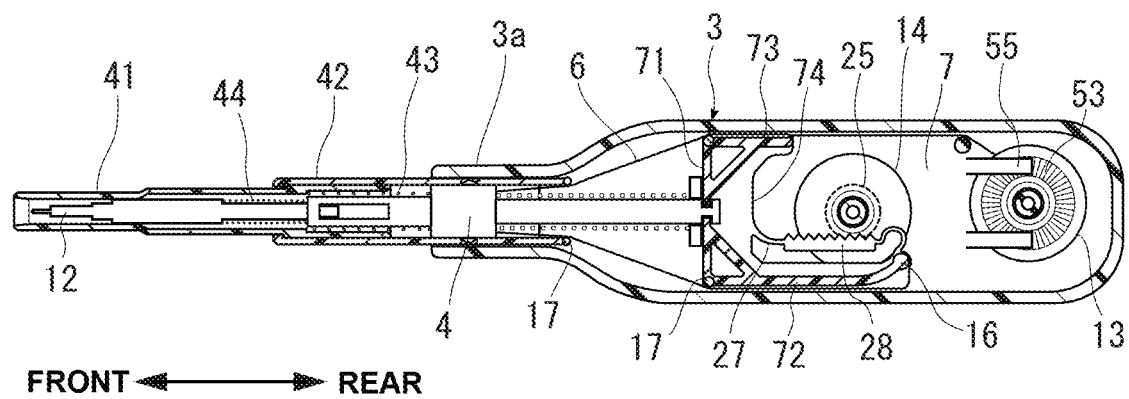
FIG. 10B is a sectional view of the optical connector cleaning tool according to the present invention.
Figure 11A:
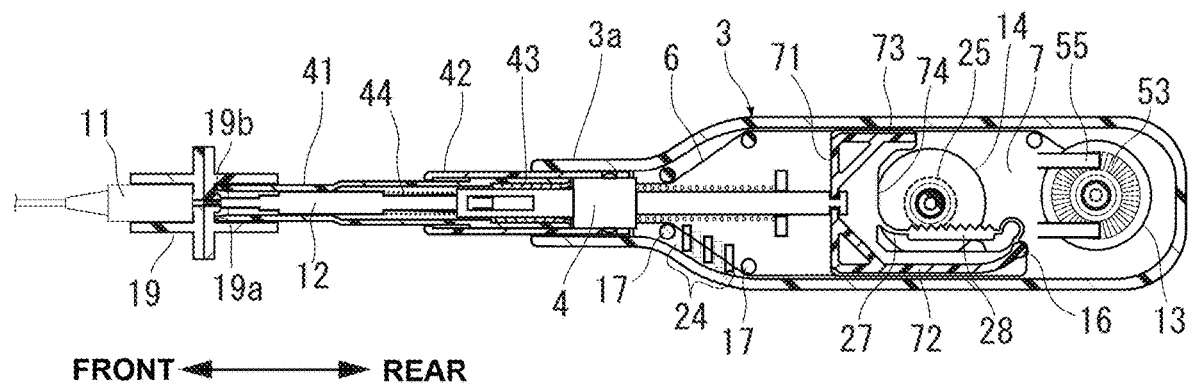
FIG. 11A is a sectional view of the optical connector cleaning tool according to the present invention.
Figure 11B:
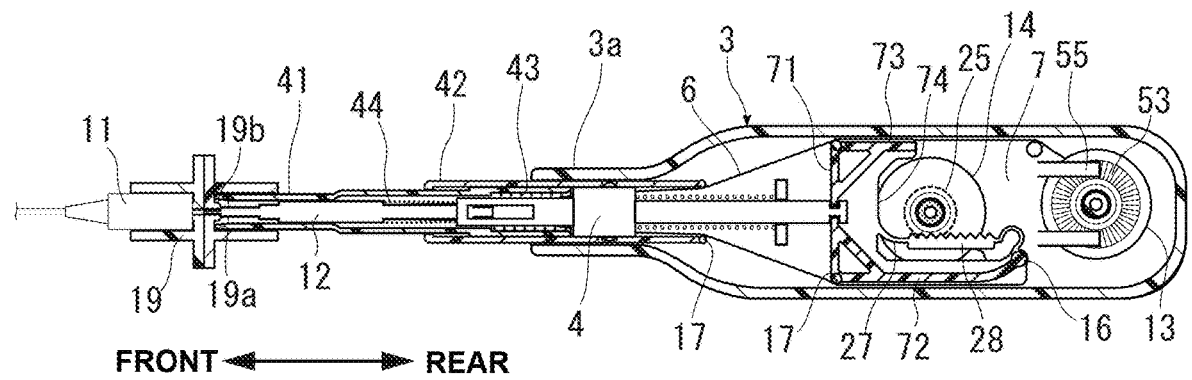
FIG. 11B is a sectional view of the optical connector cleaning tool according to the present invention.

FIGS. 10A, 10B, 11A and 11B show an example of the optical connector cleaning tool 1 incorporating the feed mechanism 2 according to the present invention, which draws out the cleaning medium 6 of a predetermined length, and the winding mechanism 21 that winds only the drawn cleaning medium 6. The same reference numerals as those of members described with reference to in FIGS. 1 to 9A and 9B denote similar members in FIGS. 10A, 10B, 11A and 11B, and a detailed description thereof will be omitted. FIG. 10A and FIG. 10B show sectional views of the normal state. FIG. 10A shows a structure in which the fixed rod 17 is provided on the side of the main body 3, and FIG. 10B shows a structure in which the fixed rod 17 is provided on the side of the moving body 5. FIG. 11A and FIG. 11B show sectional views showing a state in which the projecting portion 4 is pushed into the adapter 19 to perform cleaning. In correspondence with FIG. 10A, FIG. 11A shows a structure in which the fixed rod 17 is provided on the side of the main body 3, and FIG. 11B shows a structure in which the fixed rod 17 is provided on the side of the moving body 5. The projecting portion 4 of the optical connector cleaning tool 1 shown in FIGS. 10A and 10B and FIGS. 11A and 11B includes a guide 41 configured to guide the cleaning head 12 to a sleeve 19b of the adapter 19 (see FIGS. 11A and 11B), and a guide holder 42 configured to support the guide 41.

The guide 41 and the guide holder 42 are each formed into a tubular shape. The guide 41 is supported by the guide holder 42 to be movable in the front-and-rear direction, and biased to the front side by a guide spring 43 provided between the guide 41 and the projecting portion 4. The guide 41 stores the cleaning head 12. The cleaning head 12 is supported by the projecting portion 4 to be movable in the front-and-rear direction, and biased to the front side by a head spring 44.

The guide holder 42 is fixed to the projecting portion 4 so as to integrally move, and supported by a tubular portion 3a of the cleaning tool main body 3 to be movable in the front-and-rear direction.

The cleaning tool main body 3 according to this embodiment is formed to be dividable in the axial direction of the feed-side bobbin 13 and the winding-side bobbin 14. One half portion 51 (see FIGS. 13A to 13D) of the divisionally formed cleaning tool main body 3 is provided with a part of each of the feed- and winding-side load structures 23 and 24, and the other half portion 52 is provided with the remaining portion of the winding-side load structure 24.

Figure 12:
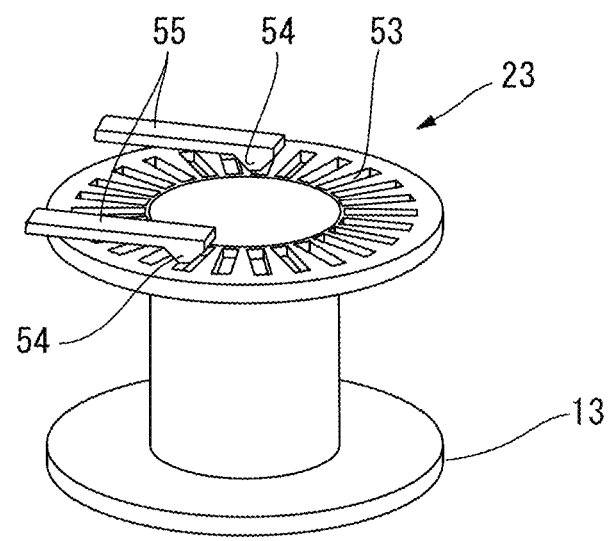
FIG. 12 is a perspective view showing a feed-side load structure.

The feed-side load structure 23 is configured as shown in FIG. 12. A number of radial grooves 53 arranged in the circumferential direction of the feed-side bobbin 13 are formed at one end (the upper surface in FIG. 12) of the feed-side bobbin 13. A plurality of pawls 54 having a width to engage with the radial grooves 53 are supported by the one half portion 51 of the cleaning tool main body 3 via elastic cantilevers 55. The cantilevers 55 are formed such that the pawls 54 engage with the radial grooves 53 by an appropriate pressing force, and elastically deform such that the pawls 54 get over between the radial grooves 53 when the feed-side bobbin 13 rotates. Hence, to rotate the feed-side bobbin 13, a torque that makes the cantilevers 55 elastically deform is needed.

The feed-side load structure 23 is necessary for the winding mechanism 21 that winds only the drawn cleaning medium 6 and additionally functions as a brake that prevents the cleaning medium 6 from being supplied from the feed-side bobbin 13 more than necessary due to impact when abruptly operated.

The winding-side load structure 24 is configured as shown in FIGS. 13A to 13D. The winding-side load structure 24 is arranged in a place different from the above-described feed-side load structure 23, and provided on the moving path of the used cleaning medium 6 that has passed through the cleaning head 12. If the feed-side load structure 23 gives a load more than the restoring force of the head spring 44 or the guide spring 43 to the feed-side bobbin 13 after the projecting portion 4 is pushed into the cleaning tool main body 3, the cleaning head 12 cannot return to the position in the normal state. For this reason, the load of the feed-side load structure 23 cannot be made so large. If a load necessary for the winding mechanism 21 according to the present invention to execute winding cannot sufficiently be obtained only by the feed-side load structure 23, the load can be increased by adding the winding-side load structure 24.

Figure 13A:
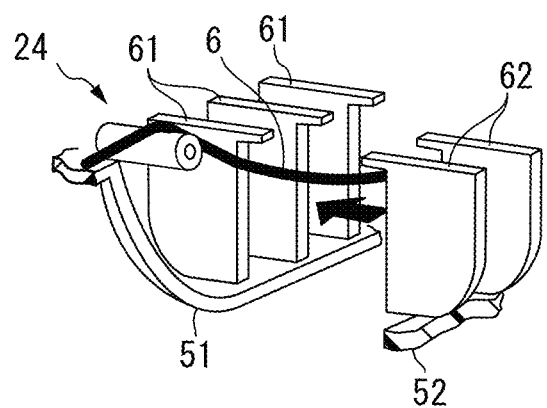
FIG. 13A is a perspective view showing a winding-side load structure.

The winding-side load structure 24 according to this embodiment is formed by a plurality of first plate-shaped fins 61 that are parallel to each other and are provided upright on the one half portion 51 of the cleaning tool main body 3, and a plurality of second plate-shaped fins 62 that are parallel to each other and are provided upright on the other half portion 52 of the cleaning tool main body 3, as shown in FIG. 13A. As shown in FIG. 13D, the first and second plate-shaped fins 61 and 62 are configured such that the distal end portions are arranged at a predetermined interval in the thickness direction (the left-and-right direction in FIG. 13D) in a state in which the other half portion 52 is combined with the one half portion 51 of the cleaning tool main body 3.

Figure 13B:
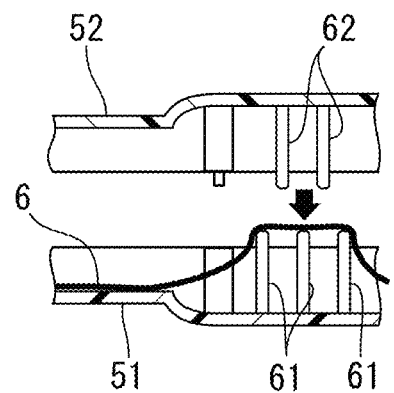
FIG. 13B is a perspective view showing the winding-side load structure.
Figure 13C:
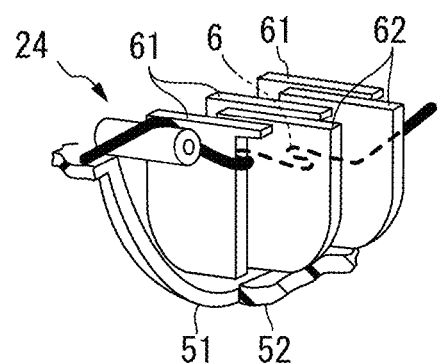
FIG. 13C is a perspective view showing the winding-side load structure.
Figure 13D:
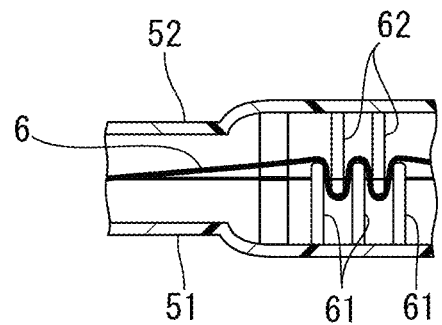
FIG. 13D is a perspective view showing the winding-side load structure.

To pass the cleaning medium 6 to the winding-side load structure 24, first, the cleaning medium 6 is passed between the first plate-shaped fins 61 and the second plate-shaped fins 62, as shown in FIGS. 13A and 13B. Then, as shown in FIGS. 13C and 13D, the one half portion 51 and the other half portion 52 are combined with each other, and the cleaning medium 6 is sandwiched between the first plate-shaped fins 61 and the second plate-shaped fins 62. After the cleaning tool main body 3 is assembled, the moving path of the cleaning medium 6 sandwiched between the first plate-shaped fins 61 and the second plate-shaped fins 62 becomes a wavy path, as shown in FIG. 13D. Hence, the load when drawing out the cleaning medium 6 is larger than in a case in which the winding-side load structure 24 is not provided. Since the wavy moving path is automatically generated at the time of assembly, the winding-side load structure 24 can easily be assembled.

In the winding-side load structure 24, the load applied to the cleaning medium 6 changes depending on the overlapping state of the first and second plate-shaped fins 61 and 62, the state in which the cleaning medium 6 and the first and second plate-shaped fins 61 and 62 are in contact with each other, the numbers of the first and second plate-shaped fins 61 and 62, and the like. Hence, a load necessary for executing the present invention can be obtained by checking the appropriate values of these parameters in advance by experiments and the like and appropriately giving the parameters.

The feed mechanism 2 of the optical connector cleaning tool 1 shown in FIGS. 10A and 10B and FIGS. 11A and 11B is formed by the rod-shaped projecting portion 4 with the front end connected to the cleaning head 12, and the moving body 5 attached to the rear end portion of the projecting portion 4.

To implement the compact optical connector cleaning tool 1, the moving body 5 is formed into a shape to be movably fitted in the cleaning tool main body 3 such that the inner surface of the cleaning tool main body 3 substantially serves as a guide surface when moving, thereby saving the space. More specifically, the moving body 5 includes a connecting portion 71 formed into a plate shape extending in the front-and-rear direction and in a direction (the vertical direction in FIGS. 10A and 10B) orthogonal to the axial direction of the winding-side bobbin 14, a lower end guide portion 72 extending rearward from one end (the lower end in FIGS. 10A and 10B) of the connecting portion 71, an upper end guide portion 73 extending rearward from the other end (the upper end in FIGS. 10A and 10B) of the connecting portion 71, and the like.

The connecting portion 71, the lower end guide portion 72, and the upper end guide portion 73 are connected to each other by a plate-shaped portion 74 extending in the frontand-rear direction on one end side of the winding-side bobbin 14 in the axial direction.

The connecting portion 71, the lower end guide portion 72, and the upper end guide portion 73 are integrally formed by integral molding using a plastic material. The connecting portion 71 includes a notch 71a (see FIG. 17) used to attach the rod-shaped projecting portion 4.

Figure 15:
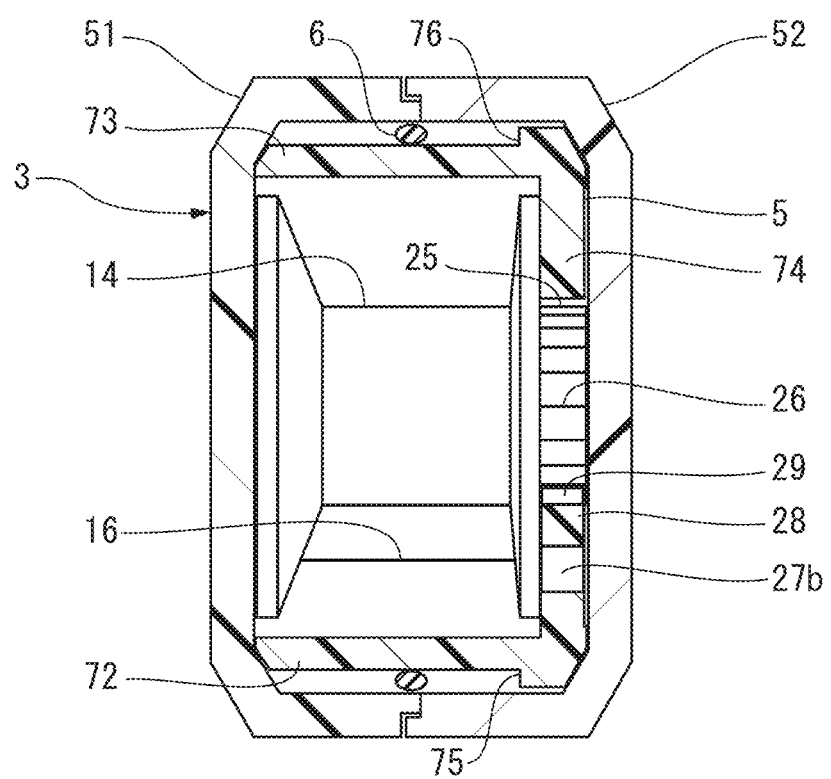
FIG. 15 is a sectional view taken along a line XV-XV in FIG. 14.
Figure 16:
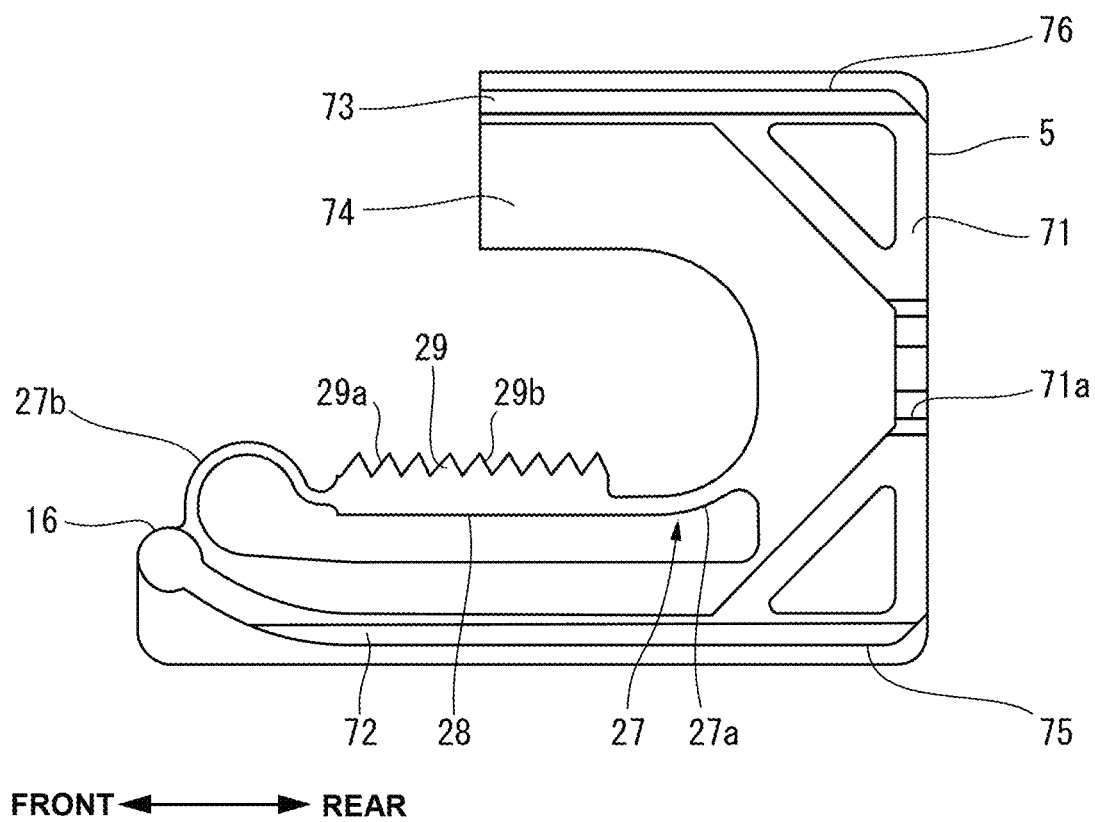
FIG. 16 is a side view of the moving body.
Figure 17:
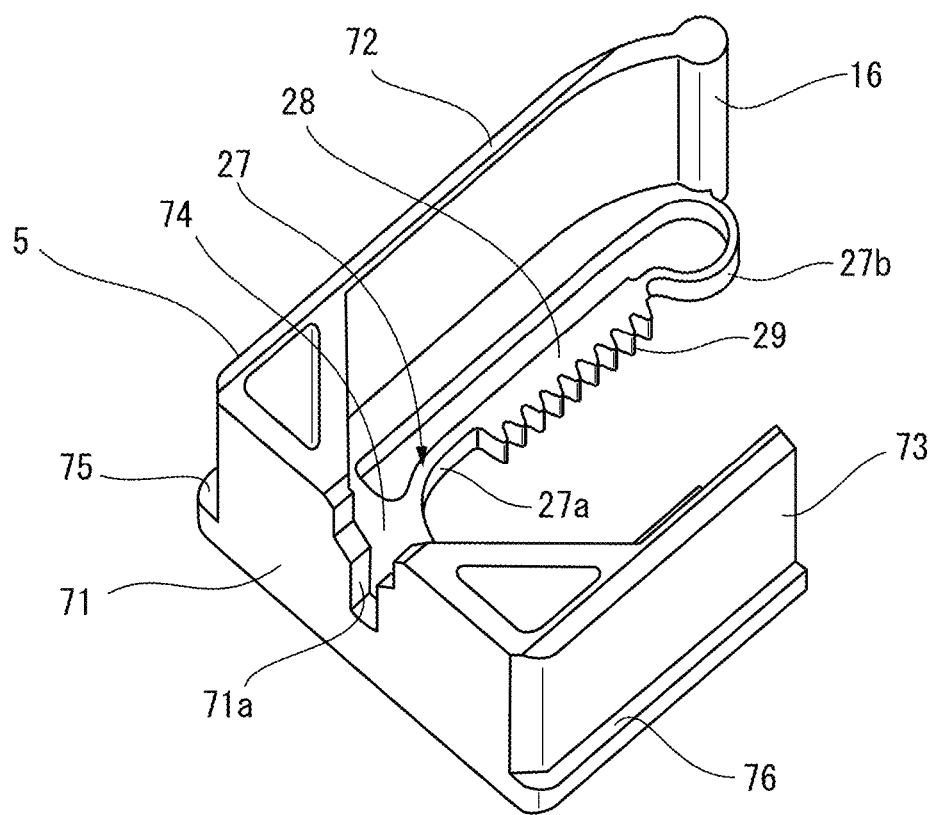
FIG. 17 is a perspective view of the moving body.

As shown in FIGS. 15 and 16, concave portions 75 and 76 are formed in the lower end guide portion 72 and the upper end guide portion 73 to pass the cleaning medium 6 between these and the cleaning tool main body 3.

Figure 14:
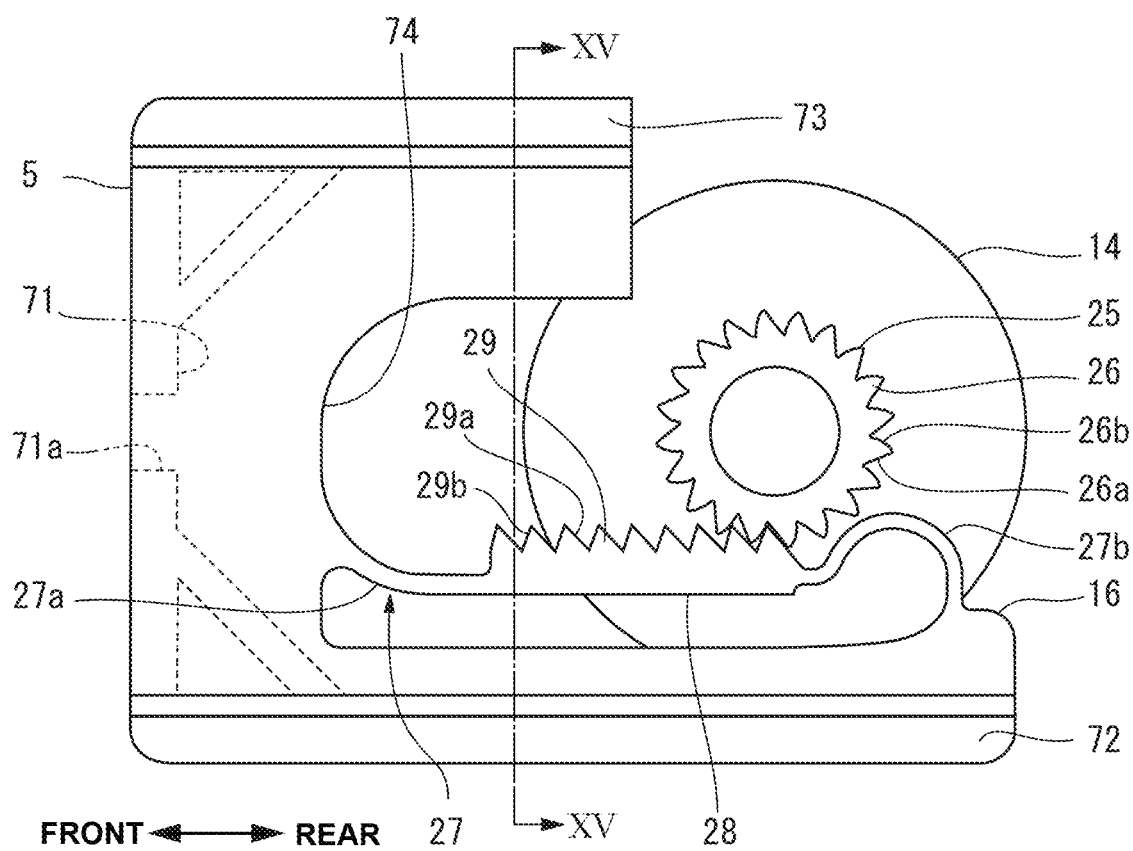
FIG. 14 is a side view of a moving body and a winding-side bobbin.

The lower end guide portion 72 is formed to be longer in the front-and-rear direction than the upper end guide portion 73, as shown in FIGS. 14 and 16. At the rear end portion of the lower end guide portion 72, the movable rod 16 is provided, and also, a part of the support spring 27 is provided. The movable rod 16 is formed into a columnar shape (see FIG. 17) extending from one end of the lower end guide portion 72 to the other end in the axial direction of the winding-side bobbin 14.

The support spring 27 according to this embodiment employs a structure that supports the driving piece 28 from both sides in the front-and-rear direction. More specifically, the support spring 27 is formed by a front-side leaf spring 27a provided between the rear end of the plate-shaped portion 74 and the front end of the driving piece 28, and a rear-side leaf spring 27b provided between the rear end of the driving piece 28 and the rear end portion of the lower end guide portion 72.

The front-side leaf spring 27a gradually curves toward the upper end guide portion 73 in the frontward direction. The rear-side leaf spring 27b is formed into an arc shape that connects the rear end of the driving piece 28 and the rear end portion of the lower end guide portion 72. This arc curves to project in the direction to separate from the lower end guide portion 72. The front-side leaf spring 27a and the rear-side leaf spring 27b support the driving piece 28 such that a number of engaging projections 29 on the driving piece 28 are arranged almost in parallel in the front-and-rear direction. In this embodiment, the support spring 27 corresponds to "support piece" in the invention described in claim 4.

A number of engaging projections 29 provided on the driving piece 28 and the engaging projections 26 of the rotation body 25, which engage with the engaging projections 29, are configured such that these mutually slip, and the driving piece 28 slips with respect to the rotation body 25 (tooth jump occurs) when the load of the engaging projections 29 of the driving piece 28 to press the engaging projections 26 of the rotation body 25 and the load corresponding to the tension of the cleaning medium 6 are applied.

More specifically, the engaging projections 26 and 29 have triangular sectional shapes with tilting surfaces 26a, 26b, 29a, and 29b, and tilt such that the tilting surfaces 26a and 29a, which mesh with each other in the process of pushing the moving body 5 into the cleaning tool main body 3, readily slip. As for the tilting surfaces 26b and 29b, which mesh with each other in the process of returning the moving body 5, appropriate angles are made such that a force is generated in a direction of moving the driving piece 28 downward when a load is applied. The rotation body 25 including the engaging projections 26 according to this embodiment and the winding-side bobbin 14 are integrally formed by integral molding using a plastic material.

<Description of Operation of Optical Connector Cleaning Tool 1>

In the thus configured optical connector cleaning tool 1, when the moving body 5 is pushed into the cleaning tool main body 3 at the time of cleaning, the driving piece 28 moves to the rear side with respect to the winding-side bobbin 14. At this time, the engaging projections 29 of the driving piece 28 press the engaging projections 26 of the rotation body 25. However, the winding-side bobbin 14 is at rest because its rotation is regulated by the one-way latch. As a result, the engaging projections 29 of the driving piece 28 slip with respect to the engaging projections 26 of the rotation body 25, the support spring 27 bends, and the driving piece 28 is displaced in the direction to separate from the rotation body 25 and slips with respect to the rotation body 25. As described above, when the moving body 5 moves to the rear side, the movable rod 16 draws out the cleaning medium 6 of a predetermined length.

When the cleaning medium 6 is drawn out in this way, cleaning is performed by the cleaning head 12. When the cleaning tool main body 3 is pulled to the rear side by weakening the force to press it to the side of the optical connector 11, the moving body 5 is moved forward with respect to the cleaning tool main body 3 by the spring force of the elastic body 22. In this case, the engaging projections 29 of the driving piece 28 and the engaging projections 26 of the rotation body 25 mesh with each other, and the winding-side bobbin 14 rotates in the winding direction. When the winding-side bobbin 14 thus rotates in the winding direction, the cleaning medium 6 drawn out by the movable rod 16 is wound. Since almost no tension is generated in the cleaning medium 6 wound around the winding-side bobbin 14 in the process of winding, and the resistance force the driving piece 28 receives is small, the winding-side bobbin 14 can easily be rotated.

However, when the winding-side bobbin 14 further rotates in the winding direction after the cleaning medium 6 drawn out by the movable rod 16 is wound, in addition to the resistance of the path of the cleaning medium 6, loads are applied to the cleaning medium 6 by the feed- and winding-side load structures 23 and 24, and tension is generated in the cleaning medium 6. In accordance with the tension, the load of the engaging projections 29 of the driving piece 28 to press the engaging projections 26 of the rotation body 25 increases to bend the support spring 27, thereby making the driving piece 28 slip with respect to the rotation body 25. For this reason, after only the cleaning medium 6 drawn out by the movable rod 16 is wound around the winding-side bobbin 14, the cleaning medium 6 is not excessively wound around the winding-side bobbin 14.

In the optical connector cleaning tool 1, the winding-side bobbin 14 can be prevented from excessively winding the cleaning medium 6 only by the components necessary for driving the winding-side bobbin 14, that is, only by driving piece 28 and the rotation body 25. A friction member as described patent literature 2 is not needed to execute this.

Hence, according to this embodiment, it is possible to wind the cleaning medium 6 of a predetermined length with a simple structure using a small number of components.

In the optical connector cleaning tool 1 according to this embodiment, the turn-back portion 18 at which the cleaning medium 6 is turned back is present only at one point between the cleaning head 12 and the winding-side bobbin 14. The feed mechanism 2 is configured such that the turn-back portion 18 moves in a direction to separate from the winding-side bobbin 14 (to the rear side).

Since the cleaning medium 6 can lightly be drawn out by the feed mechanism 2, it is possible to provide an optical connector cleaning tool of high operability, which can be operated by a small force.

The winding-side bobbin 14 according to this embodiment is configured to rotate about an axis in a direction orthogonal to the moving direction of the moving body 5. The moving body 5 includes the projecting portion 4 projecting from the cleaning tool main body 3 in a direction parallel to the moving direction. The cleaning head 12 serving as the cleaning portion is provided at the distal end portion of the projecting portion 4. The feed mechanism 2 includes the movable rod 16 (turning element) that is provided on the moving body 5 and is in contact with the cleaning medium 6 on the opposite side of the projecting portion 4 with respect to the center of the winding-side bobbin 14. The length of the drawn cleaning medium 6 when the movable rod 16 moves to the opposite side of the projecting portion 4 is configured to be equal to or more than a predetermined length necessary for cleaning.

For this reason, when the cleaning tool main body 3 is pressed toward the optical connector 11 in a state in which the cleaning portion is pressed against the optical connector 11, the feed mechanism 2 feeds the cleaning medium 6 with a necessary length or more, and the optical connector 11 is cleaned by the unused cleaning medium 6.

It is therefore possible to provide an optical connector cleaning tool capable of easily performing a cleaning operation and sufficiently performing cleaning.

The cleaning medium 6 according to this embodiment is wound around the winding-side bobbin 14 from one side of the direction orthogonal to the moving direction of the moving body 5 and the axial direction of the winding-side bobbin 14. On the above-described one side of the center of the winding-side bobbin 14, the position of the movable rod 16 at which the tangent between the winding-side bobbin 14 and the movable rod 16 becomes horizontal concerning the direction is defined as a limit position, and the movable rod 16 is arranged between the limit position and the center position of the winding-side bobbin 14.

For this reason, although the diameter of the cleaning medium 6 wound around the winding-side bobbin 14 changes, the change in the length of the cleaning medium 6 drawn out by the feed mechanism 2 is small. It is therefore possible to provide an optical connector cleaning tool in which the feed amount of the cleaning medium 6 is almost constant.

The moving body 5 according to this embodiment includes the driving piece 28 that constitutes the winding mechanism 21 together with the rotation body 25. The rotation body 25 is formed by a pinion (gear) located on the same axis as the winding-side bobbin 14. The driving piece 28 is formed by a rack that meshes with the pinion, and elastically supported by the moving body 5 via the support spring 27 having one end connected to the moving body 5 and formed by the two curved leaf springs 27a and 27b.

The rotation body 25 can be formed integrally with the shaft end portion of the winding-side bobbin 14. The driving piece 28 and the support spring 27 can be formed integrally with the moving body 5. For this reason, since the components of the winding mechanism 21 can be formed by molding using a plastic material, it is possible to provide an optical connector cleaning tool that can easily be assembled because the number of components is smaller.

The optical connector cleaning tool 1 according to this embodiment includes the feed-side load structure 23 configured to give a load to the feed-side bobbin 13 so that it hardly rotates to make a difference between the tension of the cleaning medium 6 when the winding mechanism 21 winds the cleaning medium 6 drawn out by the feed mechanism 2 and the tension when the winding mechanism 21 draws the cleaning medium 6 out of the feed-side bobbin 13.

For this reason, after the cleaning medium 6 drawn out by the feed mechanism 2 is wound around the winding-side bobbin 14, the load of the feed-side load structure 23 acts on the cleaning medium 6, and the tension of the cleaning medium 6 increases. Hence, since the driving piece 28 quickly slips with respect to the rotation body 25 at the end of the winding, the cleaning medium 6 can more reliably be prevented from being wastefully consumed.

The optical connector cleaning tool 1 according to this embodiment includes the winding-side load structure 24 configured to give a resistance to the cleaning medium 6 that has passed through the cleaning head 12 after cleaning so that it hardly moves to make a difference between the tension of the cleaning medium 6 when the winding mechanism 21 winds the cleaning medium 6 drawn out by the feed mechanism 2 and the tension when the winding mechanism 21 draws the cleaning medium 6 out of the feed-side bobbin 13.

For this reason, since the cleaning medium 6 located on the upstream side in the moving direction of the cleaning medium 6 with respect to the winding-side load structure 24 is hardly pulled by the winding-side bobbin 14, the cleaning medium 6 fed to the cleaning head 12 can be wound around the winding-side bobbin 14 without being pulled.

In the above-described embodiment, the optical connector cleaning tool 1 in which when the projecting portion 4 is pressed toward the optical connector 11, the moving body 5 moves, and the cleaning medium 6 is fed has been described. However, the present invention is not limited to this, and can also be applied to an optical connector cleaning tool that performs feed and winding of the cleaning medium using a swing type operation lever or a rotary dial. In this case, the moving body is configured to reciprocally move in synchronism with the operation lever or dial.

EXPLANATION OF THE REFERENCE NUMERALS AND SIGNS

1 . . . optical connector cleaning tool, 2 . . . feed mechanism, 3 . . . cleaning tool main body, 4 . . . projecting portion, 5 . . . moving body, 6 . . . cleaning medium, 7 . . . grip portion, 12 . . . cleaning head (cleaning portion), 13 . . . feed-side bobbin, 14 . . . winding-side bobbin, 16 . . . movable rod (turning element), 18 . . . turn-back portion, 21 . . . winding mechanism, 25 . . . rotation body, 26, 29 . . . engaging projection, 28 . . . driving piece

The invention claimed is:
1. An optical connector cleaning tool comprising:
a cleaning tool main body including a grip portion;
a feed-side bobbin configured to hold a cleaning medium wound in a roll and rotatably provided in the cleaning tool main body;
a cleaning portion on which the cleaning medium drawn out of the feed-side bobbin is exposed;
a winding-side bobbin configured to wind the cleaning medium that has passed through the cleaning portion and provided in the cleaning tool main body to be rotatable only in a winding direction to wind the cleaning medium;

a moving body configured to reciprocally move with respect to the cleaning tool main body in synchronism with a cleaning operation;

a projecting portion connected to the moving body and projecting from the cleaning tool main body in a direction parallel to a moving direction of the moving body;

a feed mechanism configured to be interlocked with the moving body, draw out the cleaning medium, and feed the cleaning medium to the cleaning portion; and a winding mechanism configured to be interlocked with the moving body and drive the winding-side bobbin in the winding direction, wherein the feed mechanism includes a turn-back portion at one point where the cleaning medium is turned back between the cleaning portion and the winding-side bobbin, and is configured to move the turn-back portion in a direction to separate from the winding-side bobbin, the winding mechanism comprises:

a rotation body including an outer peripheral surface provided with a number of engaging projections and configured to rotate integrally with the winding-side bobbin;

a driving piece extending in a tangent direction of the rotation body and formed to engage with the engaging projections and a spring arranged between the moving body and the driving piece and configured to deform elastically such that the driving piece is displaced in a direction which crosses the tangent direction of the rotation body and which moves the driving piece apart from the rotation body, wherein the driving piece is configured to press the engaging projections such that the winding-side bobbin rotates in the winding direction along with movement of the moving body toward a direction in which the projecting portion projects from the cleaning tool main body, and the driving piece is configured to slip as a result of a tooth jump with respect to the rotation body when a load to press the engaging projections such that the winding-side bobbin rotates in the winding direction has reached a predetermined load that is a load higher than a load generated when the winding-side bobbin rotates in the winding direction to wind the cleaning medium drawn out by the feed mechanism and lower than a load generated when the winding-side bobbin rotates in the winding direction to draw the cleaning medium out of the feed-side bobbin.

2. The optical connector cleaning tool according to claim 1, wherein the winding-side bobbin is configured to rotate about an axis in a direction orthogonal to the moving direction of the moving body, the cleaning portion is provided at a distal end portion of the projecting portion, the feed mechanism includes a turning element provided on the moving body and serving as the turn-back portion on an opposite side of the projecting portion with respect to a center of the winding-side bobbin, and a length of the cleaning medium drawn out when the turning element moves to the opposite side of the projecting portion is configured to be not less than a predetermined length necessary for cleaning.

3. The optical connector cleaning tool according to claim 2, wherein the cleaning medium is wound around the winding-side bobbin from one side of a direction orthogonal to the moving direction of the moving body and an axial direction of the winding-side bobbin, and on the one side of the center of the winding-side bobbin, a position of the turning element at which a tangent between the winding-side bobbin and the turning element becomes horizontal concerning the direction is defined as a limit position, and the turning element is arranged between the limit position and a center position of the winding-side bobbin.

4. The optical connector cleaning tool according to claim 1, wherein the moving body includes the driving piece that constitutes the winding mechanism together with the rotation body, the rotation body is formed by a pinion located on the same axis as the winding-side bobbin, and the driving piece is formed by a rack that meshes with the pinion, and elastically supported by the moving body via the spring, which extends in the moving direction of the moving body.

5. The optical connector cleaning tool according to claim 1, further comprising a feed-side load structure configured to give a load to the feed-side bobbin so that the feed-side bobbin hardly rotates to make a difference between a tension of the cleaning medium when the winding mechanism winds the cleaning medium drawn out by the feed mechanism and a tension when the winding mechanism draws the cleaning medium out of the feed-side bobbin.

6. The optical connector cleaning tool according to claim 1, further comprising a winding-side load structure configured to give a resistance to the cleaning medium that has passed through the cleaning portion after cleaning so that the cleaning medium hardly moves to make a difference between the tension of the cleaning medium when the winding mechanism winds the cleaning medium drawn out by the feed mechanism and the tension when the winding mechanism draws the cleaning medium out of the feed-side bobbin.

7. The optical connector cleaning tool according to claim 1, wherein the spring is configured to deform elastically such that the driving piece is displaced in a direction orthogonal to the tangent direction of the rotation body and away from the rotation body.

8. The optical connector cleaning tool according to claim 1, further comprising an elastic body configured to cause the projecting portion pushed toward the cleaning tool main body to return to an initial position.

* * * * *